United States Patent
Ghosh et al.

(10) Patent No.: US 11,409,389 B2
(45) Date of Patent: Aug. 9, 2022

(54) METHOD AND COMPUTER PROGRAM FOR MONITORING TOUCHSCREEN EVENTS OF A HANDHELD DEVICE

(71) Applicant: UNIVERSITAT ZURICH, Zurich (CH)

(72) Inventors: Arko Ghosh, Winterthur (CH); Enea Ceolini, Zurich (CH)

(*) Notice: Subject to any disclaimer, the term of this patent is extended or adjusted under 35 U.S.C. 154(b) by 0 days.

(21) Appl. No.: 16/315,663

(22) PCT Filed: Jul. 7, 2017

(86) PCT No.: PCT/EP2017/067109
§ 371 (c)(1),
(2) Date: Jan. 7, 2019

(87) PCT Pub. No.: WO2018/007594
PCT Pub. Date: Jan. 11, 2018

(65) Prior Publication Data
US 2019/0179482 A1    Jun. 13, 2019

(30) Foreign Application Priority Data
Jul. 7, 2016    (EP) .................................... 16020263

(51) Int. Cl.
*G06F 3/041*    (2006.01)
*G06F 3/0488*    (2022.01)
(Continued)

(52) U.S. Cl.
CPC .......... *G06F 3/0416* (2013.01); *G06F 3/0488* (2013.01); *G06F 9/451* (2018.02);
(Continued)

(58) Field of Classification Search
None
See application file for complete search history.

(56) References Cited

U.S. PATENT DOCUMENTS 5,832,283 A * 11/1998 Chou .................... G06F 1/3203
                                                  713/300
6,353,434 B1 * 3/2002 Akebi ................... G06F 3/0418
                                                  345/173
(Continued)

FOREIGN PATENT DOCUMENTS

CN    104360925    2/2015

OTHER PUBLICATIONS

Jinghao Shi: "Monitor Screen Touch Event in Android, Pearls in Life (blog), Nov. 9, 2014, pp. 1-2, available online at http://jhshi.me/2014711/09/monitor-screen-touch-event-in-android".
(Continued)

*Primary Examiner* — Sepehr Azari
(74) *Attorney, Agent, or Firm* — JMB Davis Ben-David (57) ABSTRACT

The invention relates to a method for monitoring touchscreen events (3) of a handheld device (6), wherein —a monitoring application (1) is provided, —at least one touchscreen event (3) on a display screen (61) of said handheld device (6) is detected by means of said monitoring application (1), wherein the touchscreen event (3) is directed to a foreground application (2), —event data (4) is generated for said at least one touchscreen event (3) by means of said monitoring application (1), wherein said event data (4) comprises a time stamp (41) of said at least one touchscreen event (3) and an identification (42) of said foreground application (2), —said event data (4) is stored by means of said monitoring application (1). The invention further relates to a computer program for executing the steps of the method according to the invention.

19 Claims, 7 Drawing Sheets

(51) Int. Cl.
    *G06F 11/34*    (2006.01)
    *G06F 9/451*    (2018.01)
    *G06F 11/30*    (2006.01)
    *G06F 9/4401*    (2018.01)

(52) U.S. Cl.
    CPC ........ *G06F 11/302* (2013.01); *G06F 11/3438* (2013.01); *G06F 11/3476* (2013.01); *G06F 9/4405* (2013.01); *G06F 2201/835* (2013.01); *G06F 2201/86* (2013.01)

(56) References Cited

U.S. PATENT DOCUMENTS

| | | | | |
|---|---|---|---|---|
| 7,131,070 | B1* | 10/2006 | Motoyama | G06F 9/547 715/745 |
| 2004/0205377 | A1* | 10/2004 | Nakamura | G06F 11/1494 714/4.5 |
| 2005/0183143 | A1* | 8/2005 | Anderholm | G06F 11/32 726/22 |
| 2006/0122474 | A1* | 6/2006 | Teller | A61B 5/02055 600/300 |
| 2011/0238496 | A1* | 9/2011 | Gurbuxani | G06Q 30/02 705/14.49 |
| 2012/0221895 | A1* | 8/2012 | Mollicone | G06Q 30/02 714/32 |
| 2013/0212677 | A1* | 8/2013 | Wurster | G06F 21/83 726/22 |
| 2013/0332651 | A1* | 12/2013 | Iida | G06F 11/1441 711/103 |
| 2014/0006616 | A1* | 1/2014 | Aad | G06F 21/552 709/225 |
| 2014/0115506 | A1* | 4/2014 | George | G06F 11/3438 715/764 |
| 2014/0249447 | A1* | 9/2014 | Sereno | A61B 5/6898 600/558 |
| 2014/0300554 | A1* | 10/2014 | Samuel | G06F 3/04883 345/173 |
| 2015/0011196 | A1* | 1/2015 | Jayakumar | H04W 4/029 455/418 |
| 2016/0162276 | A1* | 6/2016 | Peng | G06F 8/65 715/744 |
| 2019/0129766 | A1* | 5/2019 | Jaroch | G06F 9/542 |

OTHER PUBLICATIONS

SC Media: "Researcher demos touch logger hack for iOS, Android", youtube, Jul. 9, 2014, p. 1, available online at: https://www.youtube.com/watch?v=jZVdapxscLE.

* cited by examiner

| Foreground Process | Touchometer recording* | | | | Foreground app recording | | | |
|---|---|---|---|---|---|---|---|---|
| | No. of touches | Mean | std | | No. of touches | Mean | std | |
| App with no task | 20 | 146 | 15 | | 20 | 185 | 16 | |
| Variable task (random from 1ms to 1s) | 20 | 145 | 9 | | 17 | 544 | 277 | |
| Short task 50 ms (fixed duration) | 20 | 148 | 10 | | 20 | 179 | 9 | |
| Long task 1s (fixed duration) | 20 | 147 | 12 | | 19 | 1006 | 4 | |

| MODEL | CPU | RAM | Screen OFF writing (μs)* | Single Event writing (ms) |
|---|---|---|---|---|
| Nexus 5 | 2.26 GHz quad-core | 2GB RAM | 18.44 ± 50,73 | 10.13 ± 3.54 |
| Sony Xperia U | 1 GHz dual-core | 512MB RAM | 74.03 ± 108,56 | 33.08 ± 3.54 |

METHOD AND COMPUTER PROGRAM FOR MONITORING TOUCHSCREEN EVENTS OF A HANDHELD DEVICE

CROSS-REFERENCE TO RELATED APPLICATIONS

This is the U.S. National Stage of International Patent Application No. PCT/EP2017/067109 filed Jul. 7, 2017, which was published in English under PCT Article 21(2), and which in turn claims the benefit of European Patent Application No. 16020263.6 filed Jul. 7, 2016.

The invention relates to a method for monitoring touchscreen events of a handheld device and a computer program for executing steps of the method according to the invention.

The ubiquitous use of personal computers and smartphones have enabled powerful avenues to track and understand human behavior (Lazer, D. et al. Life in the network: the coming age of computational social science. *Science* 323, 721-723 (2009)).

These avenues can be classified as (a) tracking the activity on the internet and telephone servers to infer human actions (Lazer, D. et al. Life in the network: the coming age of computational social science. *Science* 323, 721-723 (2009); Jiang, Z.-Q. et al. Calling patterns in human communication dynamics. *Proc. Natl. Acad. Sci. U.S.A.* 110, 1600-1605 (2013), (b) tracking gross motor activity as in distances travelled or the number of steps by using built-in accelerometers, positioning systems or wearable sensors attached to the smartphones (Case M A, Burwick H A, Volpp K G & Patel M S. Accuracy of smartphone applications and wearable devices for tracking physical activity data. *JAMA* 313, 625-626 (2015), (c) the tracking of activity at the human-computer interface (Giancardo, L., Sanchez-Ferro, A., Butterworth, I., Mendoza, C. S. & Hooker, J. M. Psychomotor Impairment Detection via Finger Interactions with a Computer Keyboard During Natural Typing. *Sci. Rep.* 5, 9678 (2015)). Each of these forms of tracking provide a different perspective of human actions.

Tracking activity at the human computer interface can provide powerful insights into human behavior. For instance, the speed of key-board inputs may inform the clinics about neurological disorders impacting the motor system or the signature input patterns that can be used to make the computers more secure (Nahin, A. F. M. N. H., Alam, J. M., Mahmud, H. & Hasan, K. Identifying emotion by keystroke dynamics and text pattern analysis. *Behav. Inf. Technol.* 33, 987-996 (2014); Giancardo, L., Sánchez-Ferro, A., Butterworth, I., Mendoza, C. S. & Hooker, J. M. Psychomotor Impairment Detection via Finger Interactions with a Computer Keyboard During Natural Typing. *Sci. Rep.* 5, 9678 (2015). Furthermore, a reaction time test for assessing the effects of sleep loss using a designated smartphone application has been described (Kay, M., Rector, K., Consolvo, S., Greenstein, B., Wobbrock, J. O., Watson, N. F., Kientz, J. A. PVT-Touch: Adapting a Reaction Time Test for Touchscreen Devices. DOI 10.4108/icst.pervasivehealth.2013.252078 (2013)).

Such tracking can also quantify how users interact with websites or Apps—to improve designs and towards targeted marketing. There is also a rise in the number of Apps that profile activity on the smartphone by tracking the time spent on the smartphone, time spent on each App, the battery used and the amount of data exchanged by the phone (Sheng, M. J., Joe-Wong, C., Ha, S., Wong, F. M. F. & Sen, S. Smart data pricing: Lessons from trial planning. in 2013 *Proceedings IEEE INFOCOM* 3327-3332 (2013). doi:10.1109/INFCOM.2013.6567159; Montag, C. et al. Smartphone usage in the 21st century: who is active on WhatsApp? *BMC Res. Notes* 8, 331 (2015)).

However, these monitoring methods do not provide an accurate account of usage. In particular, they cannot distinguish between the user actually interacting with an App and the user launching an App and then performing some other activity without the smartphone. Although the described monitoring methods generate useful descriptions of human activity on the smartphone, they are not designed to provide a high resolution behavioral overview of human actions.

The document US 2015 0100887 A1 discloses a method for tracking behavioral events to be performed by an electronic device. Furthermore, the document CN 104239761 A describes a continuous identity authentication method based on touch screen slip behavior characteristics. The document US 2012 281080 A1 discloses a tracing method for a touch screen terminal, wherein display content of a touch screen is captured by means of snapshotting. All of these methods, however, do not continuously monitor touchscreen events at sufficient temporal resolution to generate a suitable behavioral overview.

Moreover, the document US 2015 088955 A1 discloses a computer-implemented method for assessing a user engagement level of a particular application used on a mobile device by detecting and storing keyboard input data of the user. The method described therein does not generate high resolution time stamps and is therefore unable to provide a high resolution behavioral overview.

Therefore, the objective of the present invention is to provide a monitoring method, which is able to generate a behavioral overview by continuously tracking human actions generated at a touchscreen interface of a handheld device at high temporal resolution.

This objective is attained by the subject matter of the independent claims 1 and 15. Embodiments of the invention are provided as dependent claims 2 to 14. The invention is described hereafter.

According to a first aspect of the invention, a method for monitoring touchscreen events of a handheld device is provided.

In the context of the present specification the term 'handheld device' designates a portable electronic device comprising a microcomputer for executing applications, a display screen, and a touchscreen for entering commands to the microcomputer by means of a touchscreen event. In particular, such a handheld device may be a smartphone, a tablet computer, or a smart watch. Many handheld devices according to the state of the art comprise a touch-sensitive display, particularly comprising a plurality of capacitive sensors.

In the context of the present specification, the term 'application' designates a computer program comprising program code which is executable on a microcomputer of a handheld device.

In the context of the present specification the term 'touchscreen event' (also termed 'tactile event') describes an event, wherein a user touches the touchscreen, particularly by means of a finger. In particular, a touch event may comprise initiating a touch, i.e. by laying a finger on the touchscreen, ending a touch, i.e. by removing a finger from the touchscreen, or changing the touching position on the touchscreen, i.e. by a swiping movement.

The method according to the invention comprises providing a monitoring application, detecting at least one touchscreen event on a display screen of the handheld device by means of the monitoring application, wherein the at least one touchscreen event is directed to a foreground application, generating event data for the at least one touchscreen event by means of the monitoring application, wherein the event data comprises a time stamp of the at least one touchscreen event and an identification of the foreground application, and storing the event data by means of the monitoring application.

In the context of the present specification, the term 'foreground application' designates an application which is active on the handheld device, wherein a window of the foreground application appears on the display screen of the handheld device, such that a user may provide commands by means of a touchscreen event, and wherein the commands are distributed to the foreground app in order to generate a response of the foreground application, particularly a visual feedback on the display screen. In particular, the function intended by the user on the touchscreen is provided by the foreground application. The term 'identification of the foreground application' designates data, particularly in the form of a number or a string, which serves to identify the foreground application, such that the identity of the foreground application at the time of the touchscreen event can later be assessed by means of the identification.

In the context of the present specification, the term 'time stamp' designates data comprising a system time of the handheld device, wherein the system time is allocated to a respective input event, particularly a touchscreen event.

Detecting touchscreen events by means of a separate monitoring application advantageously allows sequentially detecting touchscreen events directed to different foreground applications without any bias due to different processing of the touchscreen events by the respective foreground applications, which is crucial for obtaining a high resolution behavioral overview by means of the method.

The monitoring application according to the present invention is an application running on the handheld device, which is adapted to record, more particularly detect and store, touchscreen events in the background without interfering with the usage of the foreground application.

In particular, the event data are stored in a physical memory of the handheld device, more particularly a cache memory or a permanent memory, or in an external memory, which is separated from the handheld device, more particularly on a data server.

In certain embodiments, the touchscreen events are continuously detected by the monitoring application.

In certain embodiments, the monitoring application comprises an invisible window comprising a window area on a display screen of the handheld device, wherein touchscreen events within and outside the window area are detected by means of the monitoring application.

In the context of the present specification, the term 'invisible window' designates a window generated as an object at the level of the operating software when the monitoring application is active, wherein the window is not visibly displayed on the display screen.

In particular, the invisible window is generated by the monitoring application, more particularly when the monitoring application is started.

For any touchscreen event the operating system of the handheld device broadcasts the specifics of the touchscreen event to the presently active foreground application. The foreground application may or may not use this touchscreen event, and/or may or may not be in a state to use this touchscreen event. According to the standard configuration, the operating system does not broadcast the touchscreen event to any other application unless a background application is specifically permitted to use the broadcasted touchscreen event.

In particular, the monitoring application according to the present invention obtains the permission from the user at its launch to act as a special background application, which is allowed to use broadcasted touchscreen events, while a foreground application is active. However, the operating system only passes select or relevant information to the monitoring application that has been granted this permission. The invisible window of the monitoring application satisfies the operating system's criterion such that the time stamps on the touchscreen (within and outside the borders of the invisible window) and the foreground applications launched by the user are broadcasted to it.

In certain embodiments, the window area has a size of 400 pixels or less, particularly 100 pixels or less.

A small size of the invisible window ensures that the touchscreen event on the touchscreen is not consumed by the monitoring application, but is detected as a touchscreen event by both the monitoring application and the foreground application. Furthermore, by using a small-sized invisible window, obtaining automatic focus by the operating system, which would otherwise obstruct processes used by the foreground application, is avoided. Advantageously, this feature ensures that the performance of the foreground application is not affected by the monitoring application.

In certain embodiments, the at least one touchscreen event is detected prior to distribution of the at least one touchscreen event to the foreground application.

This feature ensures that the detected touchscreen events are captured before the time-stamps are distorted or lost due to the chain of computations of the foreground application. Advantageously, this allows providing accurate and high resolution time-stamp data.

Tactile events are typically detected and then used to infer a certain gesture and a certain computation is triggered corresponding to the inferred gesture, i.e. a graphical rendering to provide a visual feedback of the keyboard tap. During the rendering or any other computation triggered by an event, i.e. event n, the foreground application may not be responsive to tactile events or even register subsequent tactile event, i.e. n+1. If the time-stamps were extracted from further upstream at the level of the foreground application, it would suffer from both delays and misses.

In certain embodiments, the time stamp comprises a temporal resolution that is smaller than 15 ms, particularly smaller than 5 ms.

In certain embodiments, the event data further comprises spatial coordinates of the at least one touchscreen event on the display screen of the handheld device, a parameter indicating whether a pop-up keypad is displayed on the display screen of the handheld device, and/or the number of pixels activated by means of said at least one touchscreen event.

In the context of the present specification, the term 'spatial coordinates of the at least one touchscreen event' refers to the two-dimensional position in space of the pixels activated on the display screen in relation to the borders of the display screen by means of the respective touchscreen event.

In the context of the present specification, the term 'pop-up keypad' designates a graphical representation of a keypad on the display screen of the handheld device, wherein characters may be entered by a user by means of touching different areas of the pop-up keypad on the display screen.

In certain embodiments, at least one button event, particularly at least one home button event or at least one on-off switch event, is detected by means of the monitoring application, wherein event data comprising a time stamp of the at least one button event is generated and stored by means of the monitoring application.

In the context of the present specification, the term 'button event' designates an event in which a user presses a button or a switch of the handheld device. The term 'home button event' refers to an event, in which a user presses the home button of the handheld device, and the term 'on-off-switch event' refers to an event, in which a user presses the on-off switch of the handheld device.

The term 'home button' designates a button which is adapted to trigger the display of a home screen on the display screen of the handheld device. In particular, the home screen is a screen by which a plurality of applications can be selected and started by a user by means of a touchscreen event.

The term 'on-off switch' designates a switch which is adapted to switch the handheld device on or off and/or trigger entry into or exit from a standby mode of the handheld device.

In certain embodiments, the event data is stored in a cache memory of the handheld device.

Continuously storing the event data of each touchscreen event in a permanent memory may result in slowed performance of the handheld device. Therefore, storing data in a cache memory advantageously ensures that the performance of the handheld device is unaffected by the monitoring application.

In certain embodiments, a screen-off event is detected by means of the monitoring application, wherein the event data in the cache memory is stored in a permanent memory following detection of the screen-off event.

In the context of the present specification, the term 'screen-off-event' designates an event, whereby a user turns off the screen or initiates a standby mode of the handheld device, particularly by pressing an on-off switch of the handheld device.

This feature ensures that data in the cache memory are not lost due to a screen-off event, and postpones the performance consuming saving procedure to a time after switching of the handheld device when no performance is needed.

In certain embodiments, the event data is stored in a cache memory of the handheld device, and a screen-off event is detected by means of the monitoring application, wherein the stored event data in the cache memory is stored in a permanent memory following detection of the screen-off event.

This combination is especially advantageous because the transfer of the event data from the cache memory to the permanent memory is performed directly at the level of the monitoring application without any additional application.

In certain embodiments, the permanent memory is located on a data server, wherein particularly the event data are transferred from the cache memory of the handheld device to the data server, more particularly by means of a wireless connection.

In certain embodiments, a reboot event of the handheld device is detected, wherein the monitoring application, particularly the invisible window of the monitoring application, is automatically started or restarted following the reboot event. In particular, the monitoring application is rebooted automatically without any need of human interaction.

In the context of the present specification, the term 'reboot event' designates an event, wherein the operating software of the handheld device is restarted.

This feature ensures the continued operation of the monitoring application. Advantageously, this allows continuous collection of event data after the handheld device has been shut down and restarted.

In certain embodiments, the method is used to collect data for analyzing a behavior of at least one subject using a handheld device.

The behavior to be analyzed is in some way related to the use of the handheld device.

Due to the features described above, the method according to the present invention is especially well-suited for analyzing human behavior continuously at a variety of different timescales.

In certain embodiments, the analyzed behavior comprises at least one fast activity, wherein the fast activity occurs at a timescale of less than 1 s, particularly less than 100 ms. Therein, the term 'fast activity' describes an activity which occurs at a timescale of less than 1 second, particularly less than 100 milliseconds.

In particular, such fast activities may be touchscreen gestures, more particularly swiping, activating menu buttons or typing on the touchscreen. The temporal pattern of such gestures may provide information about the neuronal characteristics of the subject. Moreover, in age-related decline the users are expected to become slower at these fast time-scales.

In certain embodiments, the analyzed behavior comprises at least one slow activity, wherein the slow activity occurs at a timescale of more than 1 s, particularly more than 1 h, more particularly more than 1 day. Therein, the term 'slow activity' describes an activity which occurs at a timescale of more than 1 second, particularly more than 1 hour, more particularly more than 1 day.

In particular, such slow activities may be individual habits and/or rhythms, particularly sleeping behavior, working hours, work breaks, weekend activities, and/or social behavior, more particularly the regularity with which individuals engage in social or non-social activities, most particularly relating to social applications on handheld devices. These slower time scales additionally inform on how the attention span of the users is distributed across different activities.

In certain embodiments, the analyzed behavior comprises at least one fast activity and at least one slow activity, wherein the fast activity occurs at a timescale of less than 1 s, particularly less than 100 ms, and wherein the slow activity occurs at a timescale of more than 1 s, particularly more than 1 h, more particularly more than 1 day. Therein, the term 'fast activity' describes an activity which occurs at a timescale of less than 1 second, particularly less than 100 milliseconds, and the term 'slow activity' describes an activity which occurs at a timescale of more than 1 second, particularly more than 1 hour, more particularly more than 1 day.

The method according to the present invention is able to detect and store touchscreen events over a very broad range of timescales, and therefore advantageously allows simultaneous monitoring of various behavioral processes, providing a broad behavioral overview.

According to a second aspect of the invention, a computer program for monitoring touchscreen events is provided. The computer program comprises program code, wherein the program code prompts a computer to execute the method according to the first aspect of the invention if the computer program is loaded, installed or executed on the computer. In particular, the computer program is the monitoring application according to the present invention.

Further features and advantages of the invention shall be described by means of detailed descriptions of embodiments of the present invention with reference to the figures, wherein.

Figure 1:
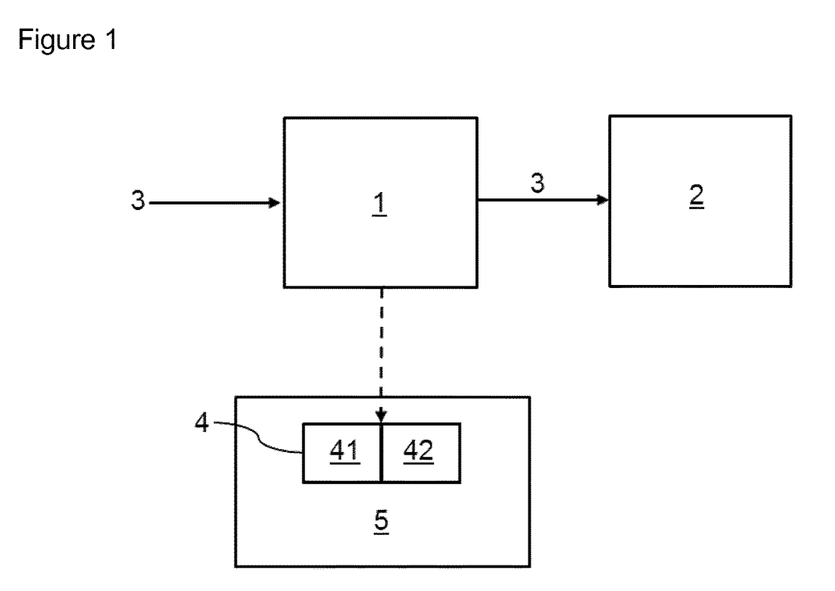
FIG. 1 shows a flow chart representing an embodiment of the method according to the invention.

FIG. 1 shows a flowchart representing an embodiment of the method according to the invention. A touchscreen event 3 is detected by a monitoring application 1 running on a handheld device. The monitoring application 1 saves event data 4 corresponding to the touchscreen event 3 in a cache memory 5 (dashed arrow). The event data 4 comprises a time stamp 41 of the touchscreen event 3 and an identification 42 of a foreground application 2 running on the handheld device. The event data 4 can later be transferred from the cache memory 5 to a permanent memory (not shown).

Following storage of the event data 4, the touchscreen event 3 is transferred to the foreground application 2, by which the touchscreen event 3 may be processed.

Figure 2:
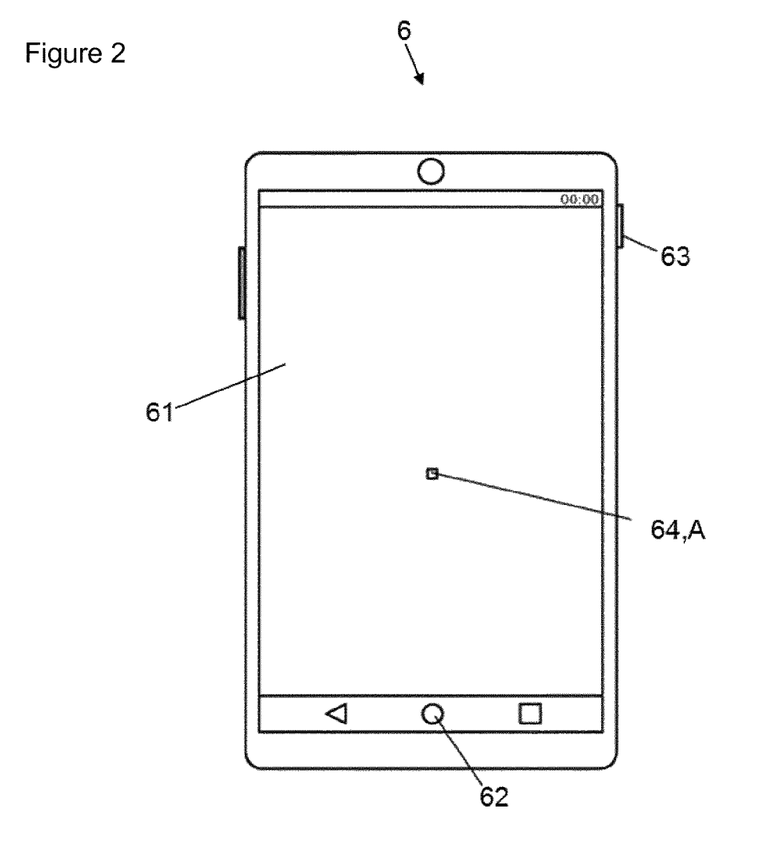
FIG. 2 shows a schematic representation of a handheld device.

FIG. 2 shows a handheld device 6 comprising a display screen 61, a home button 62, and an on-off switch 63.

The event data 4, particularly time stamps 41 corresponding to a button event generated by pressing the home button 62 and/or the on-off switch 63 can be recorded by a monitoring application 1 according to the invention, which is running on the shown handheld device 6.

Furthermore, an invisible window 64 having a screen area A is schematically depicted on the display screen 61. Event data 4 of touchscreen events 3 within and outside the boundaries of the invisible window 64, particularly time stamps 41 and identifications 42 of a foreground application 2 running on the handheld device 6, can be recorded by a monitoring application 1 according to the invention, which is running on the depicted handheld device 6.

Figure 3:
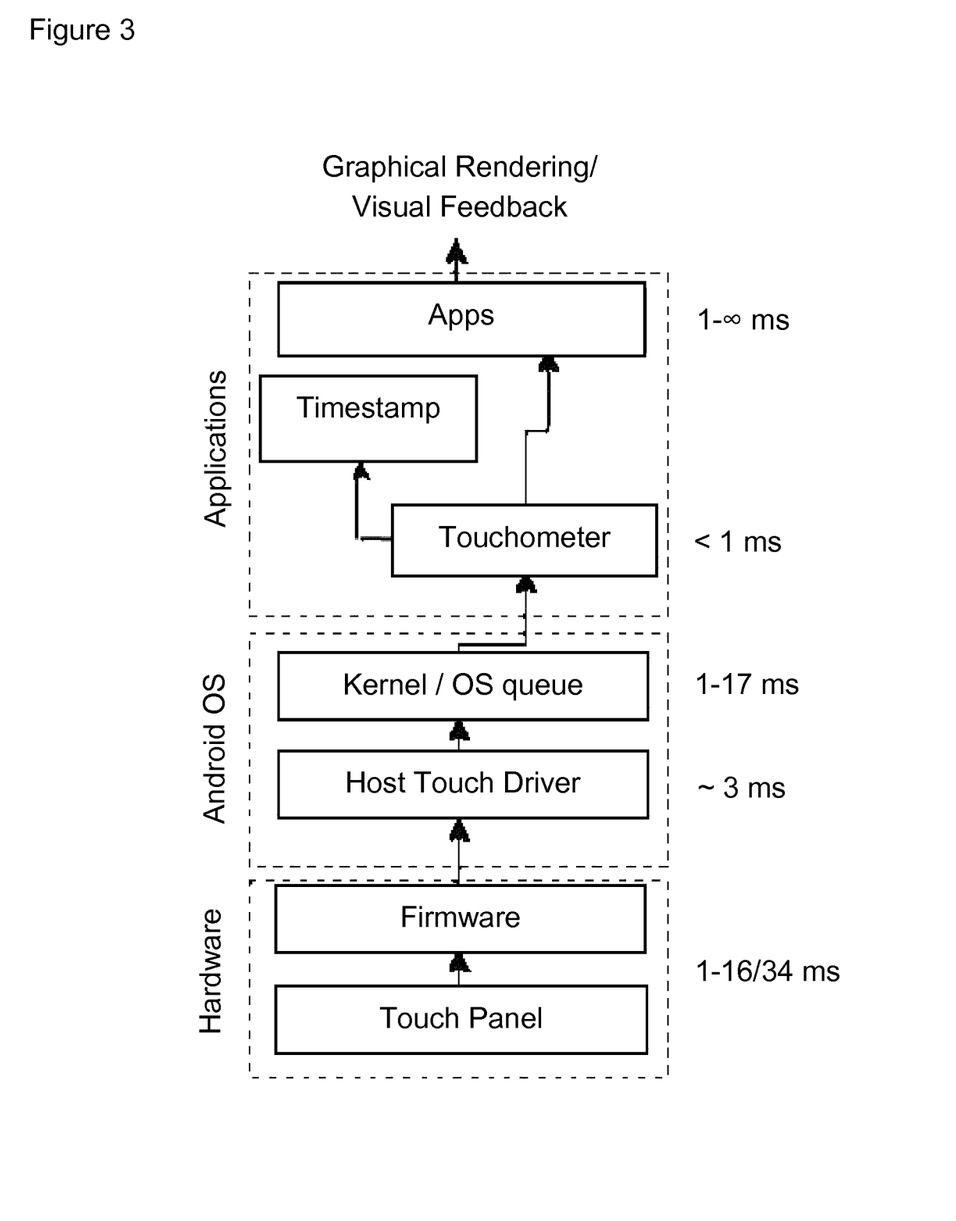
FIG. 3 shows a schematic representation of hardware and software components of a handheld device.

FIG. 3 shows a schematic representation of the architecture of hardware and software components of a handheld device. The position of the monitoring application (indicated as 'Touchometer') in the architecture is downstream of the Kernel/operating system queue and upstream of the foreground application (indicated as 'Apps'), such that touchscreen events can be recorded with minimal time-delay between the touchscreen event and recording. The times denote the transmission delays of the touchscreen event. By registering the touchscreen event prior to its distribution to the foreground application, a high temporal accuracy is achieved.

Figure 4:
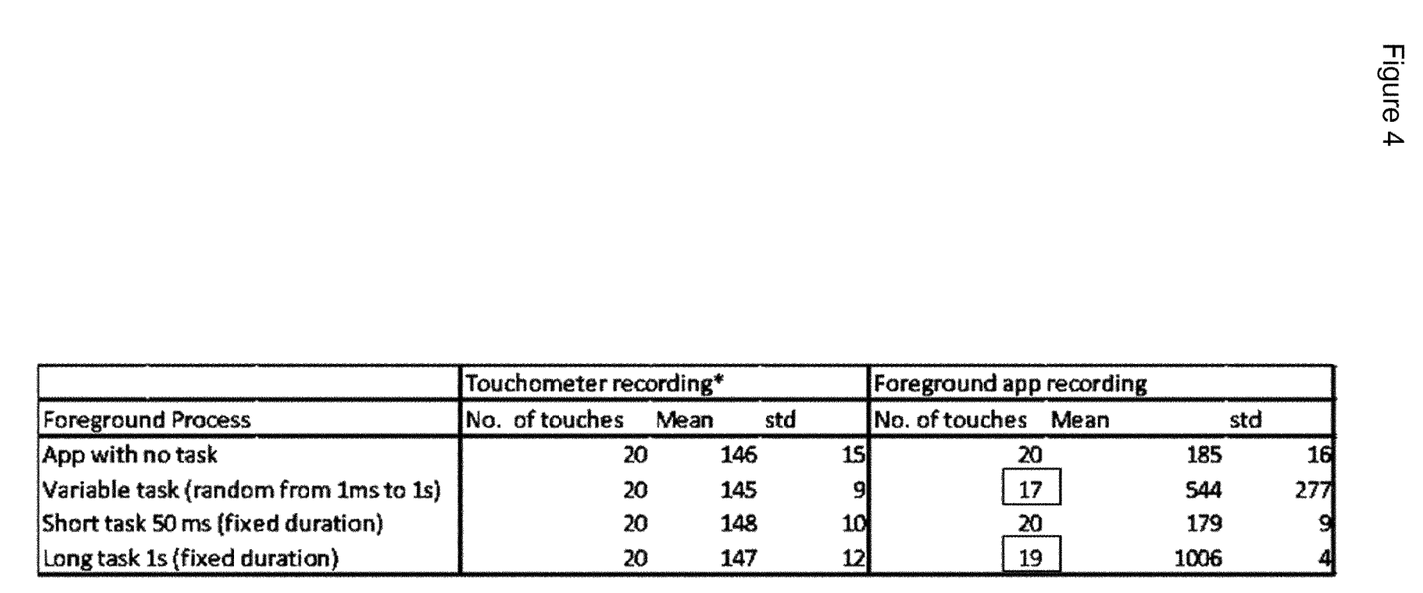
FIG. 4 shows time stamps recorded by means of the monitoring application according to the invention and by a foreground application.

FIG. 4 shows time stamps recorded by means of the monitoring application according to the invention and by a foreground application. Recording the time stamp of tactile events at the level of the monitoring application ('Touchometer') is more precise than at the level of the foreground application ('Foreground app'). The presence of ongoing computations in the foreground application may not only delay the recording of events but also result in missed events. The table reports the inter-touch intervals in ms. The volunteer was instructed to perform touchscreen touches at 7 Hz (anticipated inter-touch interval of 142 ms). * indicates the method according to the invention.

Figure 5:
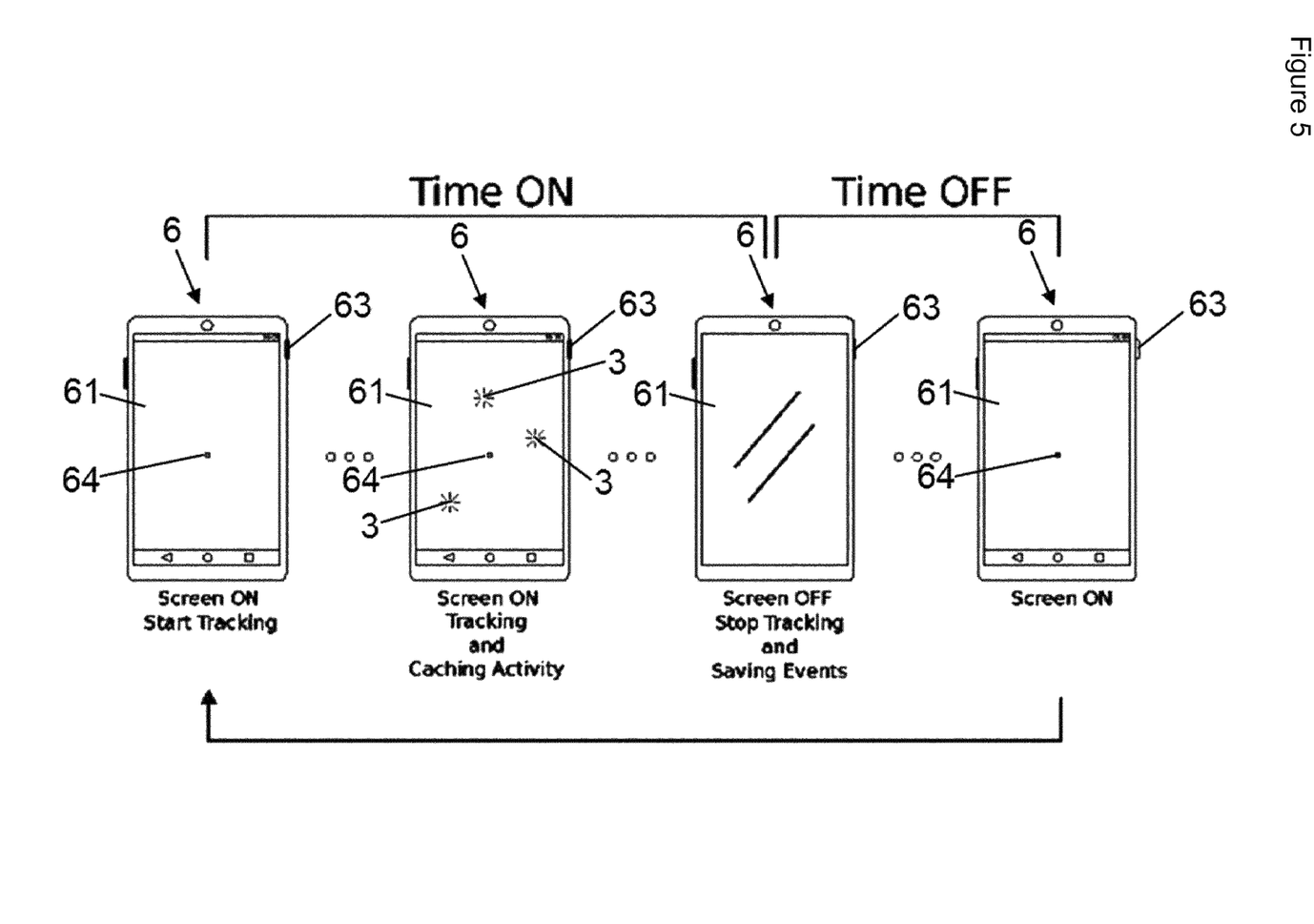
FIG. 5 shows a schematic representation of steps of the method according to the invention.

FIG. 5 shows a schematic representation of steps of the method according to the invention on a handheld device 6. When the display screen 61 of the handheld device 6 is turned on, particularly by means of the on-off switch 63, an invisible window 64 is generated and tracking of the touchscreen events 3 is started.

The captured touchscreen events 3 are stored in a cache, and when the display screen 61 is turned off, the event data 4 is saved on a permanent log. This process is repeated on every usage cycle.

Figure 6:
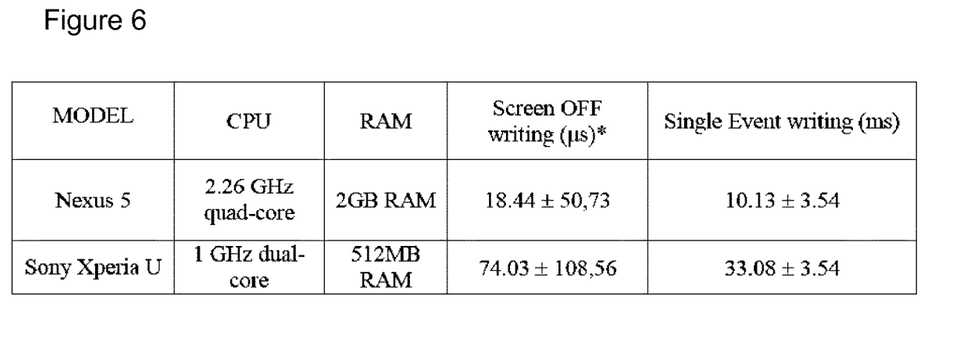
FIG. 6 shows measured delay times when writing to storage using the method according to the invention.

FIG. 6 shows data from the measurement of the time spent in caching each event when the writing to storage is delayed until the end of the session, i.e. when the screen is switched OFF (as in the monitoring application according to the invention), compared to dynamically writing single events. * designates the method according to the invention.

Figure 7:
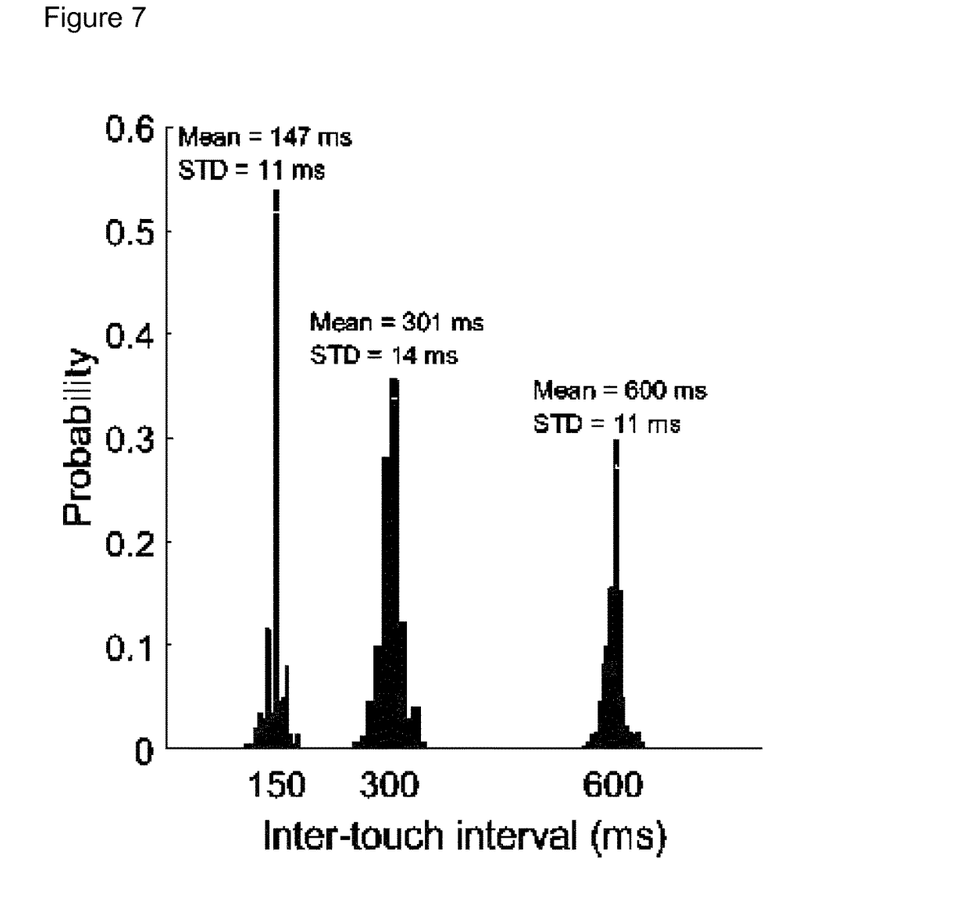
FIG. 7 shows distribution of inter-touch intervals using the method according to the invention.

FIG. 7 shows probability distributions of inter-touch intervals measured using the monitoring application according to the invention (ground truth vs. software measurements). The real inter-touch intervals were separated by 150, 300 and 600 ms. The probability distributions are based on 200 repetitions.

Figure 8:
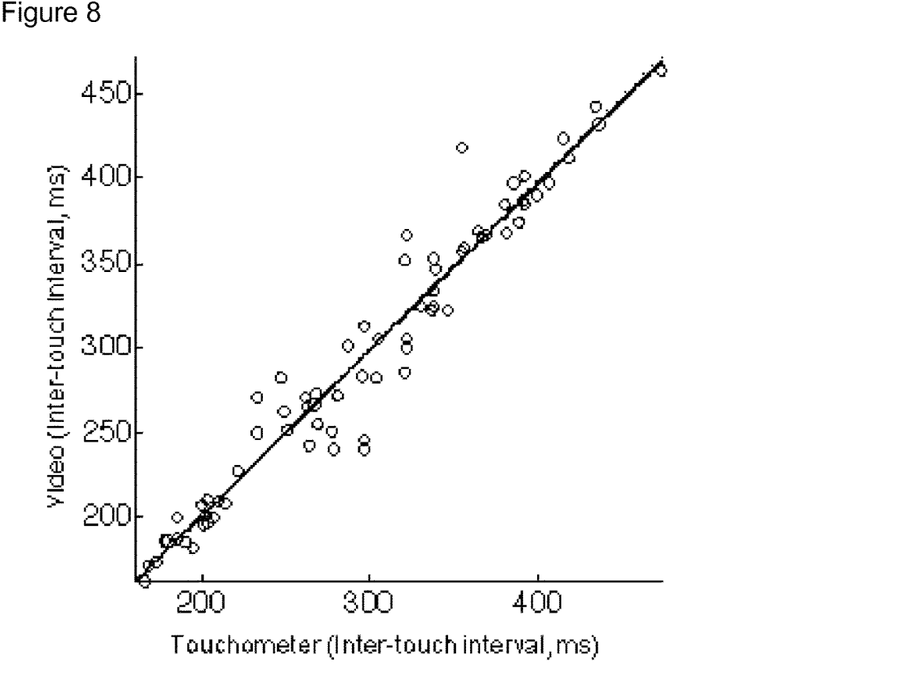
FIG. 8 shows inter-touch intervals recorded using the method according to the invention compared to video camera data.

FIG. 8 shows inter-touch intervals recorded using the method according to the invention plotted against inter-touch intervals measured by means of a 1000 fps video camera. The analysis was based on 70 touchscreen taps.

Figure 9:
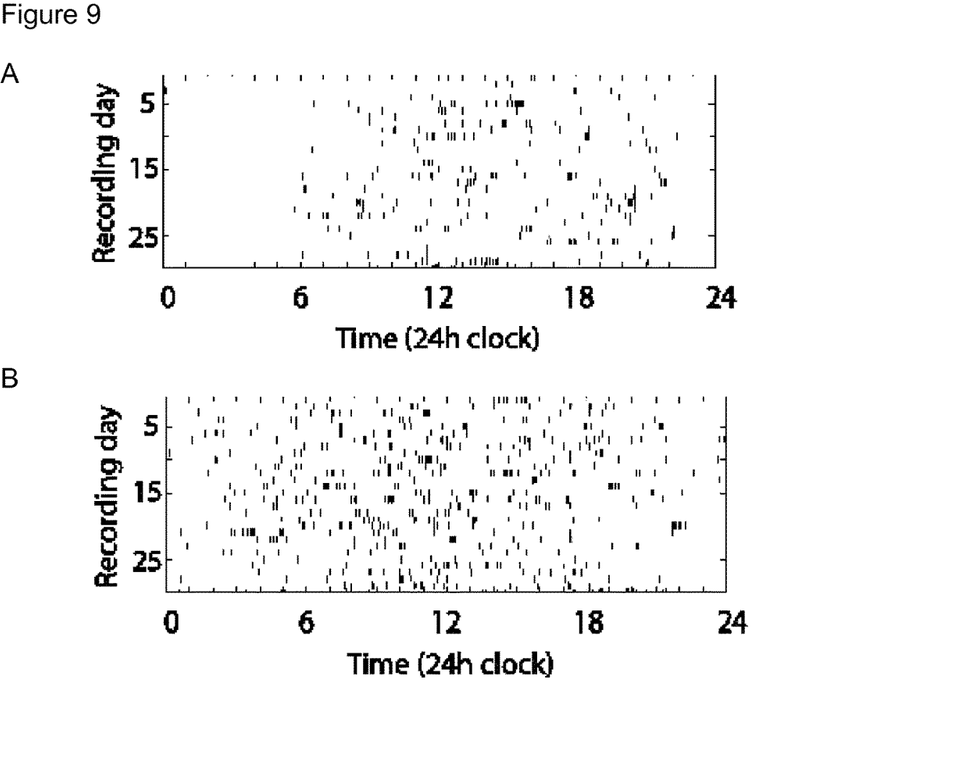
FIG. 9 shows smartphone usage data recorded by means of the method according to the invention.

FIG. 9 shows a smartphone usage overview based on monitoring touchscreen tactile events in two individuals. One shows clear night breaks (panel A) and the other does not (panel B). Touchscreen events are shown at a lower resolution than collected and the presence of a tactile event in 1 minute bins is marked with a vertical bar. Note that the circadian patterns and the amount of night time rest can be inferred from this data.

Figure 10:
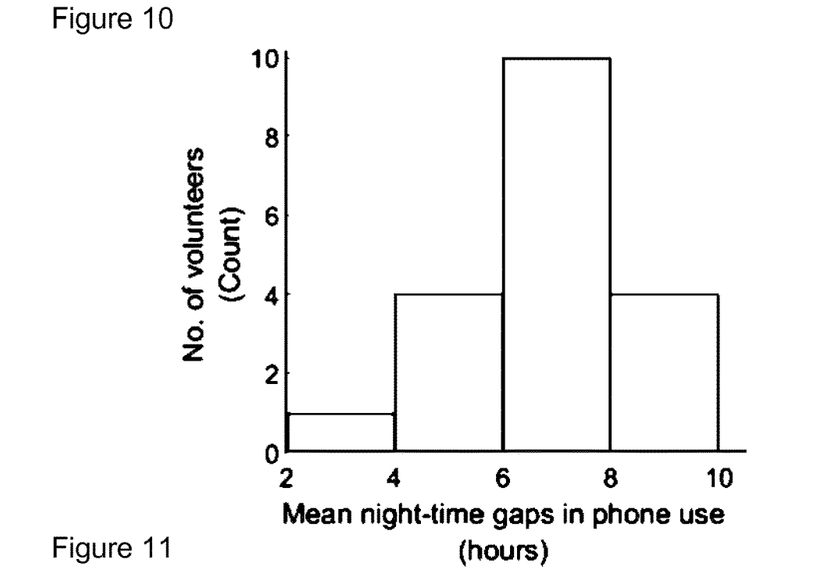
FIG. 10 shows a distribution of median night-time gaps in smartphone usage recorded by means of the method according to the invention.

FIG. 10 shows a distribution of median night-time gaps in smartphone use in a sampled population measured by means of the monitoring application according to the invention.

Figure 11:
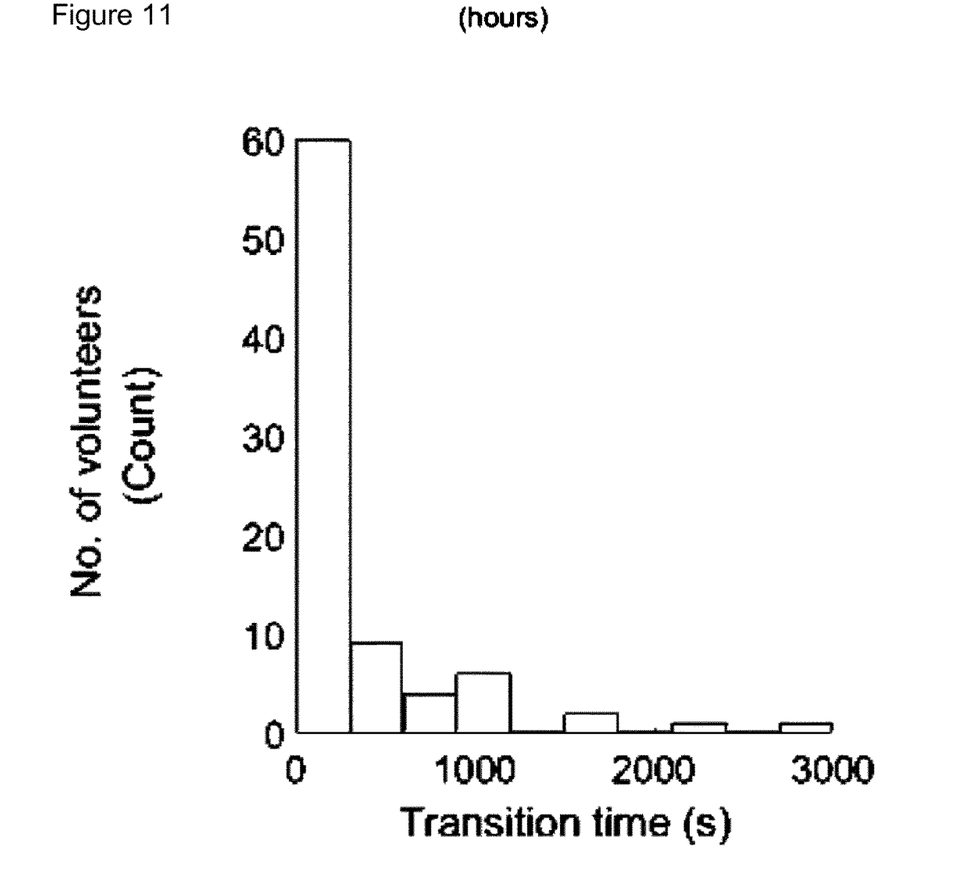
FIG. 11 shows a distribution of the time taken to transition from a social foreground application to a non-social foreground application from data recorded by means of the method according to the invention.

FIG. 11 shows a distribution of the time taken to transition from a social smartphone application to a non-social smartphone application in a sampled population measured by means of the monitoring application according to the invention.

The invention is further illustrated by the following example.

EXAMPLE

Touchscreen smartphones are ubiquitously used and engage a range of processes for action control. Some of these processes occur at the time scale of milliseconds—only limited by the speed of motor coordination or the refresh rate of the screen—and others occur at the time scale of hours—reflecting for example the number of hours of sleep. However, given the complexity and range of smartphone behavior its parametrization remains challenging. Here we document a method to quantify the full range of touchscreen behaviors and also the surrounding behavioral context by using a software that seamlessly records the precise (millisecond-range) timestamps of each touchscreen touch and the app in use. Importantly the background tracking is optimized so as to not perturb the intended behavior on the touchscreen. The broad behavioral overview generated by this method has implications for surveillance in general and will enable a range of new analysis that would help unravel the cognitive processes underlying modern human actions.

We consider the touchscreen events to be key events in human behavior on the smartphone, and assume that tracking that in context with the App in use contains a rich source of information on human behavior. Essentially, a range of behavioral parameters may be extracted from the recording of the touchscreen interactions alone without monitoring all the complex visual and auditory aspects of the phone interactions. This reduction is particularly useful in storing long-term descriptions of human activities without compromising on the complexity of the recorded behavior. However, to continuously record all of the events generated on the touchscreen a new background software (App) must perform without interfering with the user interactions and provide the millisecond-range time-stamps of the events. Here we describe a new background App that can continuously track the touchscreen touches with millisecond precision for long periods (months/years).

Software Design

The key feature of this software is that it combines the ability to record touchscreen events in the background without interfering with the usage of the foreground App (i.e., the function intended by the user on the touchscreen) and the high resolution recording of touchscreen events. The following are the key elements of the design, which in combination result in the high resolution behavioral interview. Only two key events are logged for each touchscreen interaction in the current form: (1) The time-stamp of the onset of the tactile event and (2) the App towards which the tactile event was intended (or the foreground App). Additional events such as the launch of pop-up key pad can be additionally tracked without impacting the functionality of the Touchometer.

Invisible Window

To collect the touchscreen events we designed an invisible window on the touchscreen such that the time-stamps of the events and the targeted foreground App that occurred within and outside the boundaries of the window could be continuously recorded. The programmed window was generated by the software whenever the screen was unlocked, and in the case of a crash or rebooting the window was restarted automatically.

The window was reasoned in the following manner. In general, for any tactile event the operating system broadcasts the specifics of the tactile event to the foreground App. For instance, when the Facebook App is in the foreground, the details of any tactile event is broadcasted to the App (although the App may or may not use this event or not be in a state to use this event as described below). The operating system on the phone does not broadcast this event to any other App unless a background App is specifically permitted to use the broadcasted events. Therefore, 'Touchometer' obtains the permission from the user at its launch to act as a special background App. Still, the operating system only passes select or relevant information to the background App that has been granted this permission. The invisible window 'displayed' on the touchscreen by 'Touchometer' satisfies the operating system's criterion such that the time stamps on the touchscreen (within and outside the window borders) and the foreground Apps launched by the user are broadcasted to it.

In certain renditions (in older versions of Android or customized edits of the operating system), the operating system also broadcasts more information on the touchscreen: the coordinate of the tactile event, the launch of the key pad, the inferred force and the number of pixels activated by the touchscreen.

The transparent window was designed such that it remained above all other views, did not consume the tactile event, was able to detect events within and outside the borders of the window and was sufficiently small (<10×10 pixels) such that the window itself did not gain automatic focus of the operating system. The window was maintained above all applications by calling TYPE_PHONE. The consumption of the tactile event—even if entirely within the invisible window—was prevented by using FLAG_NOT_TOUCH_MODAL.

This ensured that the tactile events were propagated on to the foreground App. The functions called by FLAG_WATCH_OUTSIDE_TOUCH enabled the window to be alerted even if the touches occurred outside of the invisible window. Finally, the small size prevented the invisible window from gaining automatic focus of the operating system. This was important to prevent as gaining automatic focus would have prevented the operating system from seamlessly performing the computations intended by the user or the foreground application.

For instance, when an EditText is present on the screen for a foreground application if the invisible window were to get automatic focus then the operating system would be obstructed from popping-up a keyboard. Simply put, if the automatic focus of the operating system was not disabled for the invisible window the background application would have perturbed the functions associated with the automatic focus of the operating system on the foreground application.

Obtaining Touchscreen Events Close to the Hardware Source

To ensure that the touchscreen events could be captured before the tactile time-stamps are distorted or lost due to the chain of computations, we recorded the touchscreen events before the touches were passed on to the Apps for usage (FIG. 3). To elaborate, tactile events are typically detected and then used to infer a certain gesture and a certain computation is triggered corresponding to the inferred gesture—say a graphical rendering to provide a visual feedback of the keyboard tap.

During the rendering or any other computation triggered by an event, say event n, the foreground App may not be responsive to tactile events or even register subsequent tactile event, say n+1. Essentially, if the time-stamps were extracted from further upstream at the level of the foreground App, it would suffer from both delays and misses. To simply illustrate the nature of the delays and inaccuracies we simulated three different scenarios while a volunteer tapped on the touchscreen at approximately 7 Hz to operate a test foreground App. We simultaneously recorded the tactile events at the level of the 'Touchometer' and at the level of a test foreground App.

The three scenarios simulated by the test App were, (i) when an App simply recorded the touches, (ii) when the app performed computations lasting between 1 ms to 1 s triggered by a tactile event and (iii) when the App performed fixed tasks lasting 50 ms and 1 s triggered by a tactile event. We measured the inter-touch intervals in these different conditions, and in all of the conditions the touches were measured more reliably at the level of the 'Touchometer' than at the level of the test App (FIG. 4).

Saving Data when the Screen is Turned Off

A major issue with recording each touchscreen event is that saving the data on the phone upon each event may tax on the ongoing operations of the phone making the performance slower. To circumvent this problem our software stores the events on a cache and saves the data into a more permanent log only when the screen is turned off (FIG. 5). In the current form the data is permanently logged on the phone but the same on-phone software layout can also be used in conjunction with data-servers where the data is intermittently updated with the recent log.

Automatic Reboot

A minor feature ensured the continued operations of the software, that it is rebooted automatically without the need of human interaction. This feature ensures that software continues to log data after the phone has been shut down and restarted.

Demonstration of Features

We collected data from volunteers towards the following reasons, one, to validate the utility of design elements and two, to demonstrate that the software can operate to yield a high resolution behavioral overview.

Impact of Data Saving Method

Tactile events were saved at the end of each session when the touchscreen was turned off to prevent the loss of running memory associated with dynamically collecting and writing the recorded events (FIG. 6). Our measurements clearly demonstrate that the design method is essential towards not disturbing the intended operations of the phone.

Validation of Temporal Accuracy

We validated the measures by using artificial touches generated on the touchscreen and by recording touchscreen touches made by a volunteer in conjunction with a high-speed video camera. First, we established the error distributions by using artificial touches generated by using a computer controlled solenoid tapper on a standard touchscreen (capacitive, 111 Hz scan rate) (FIG. 7). The artificial touches were 100 ms long and the onset-to-onset times were 150 ms, 300 ms and 600 ms. The corresponding mean 'Touchometer' readings were at 147, 301 and 600 ms respectively, with standard deviations less than 15 ms.

In separate recordings to validate the 'Touchometer' measurements we recorded the touches performed by a volunteer by using a 1000 fps video camera. The video and 'Touchometer' data matched with an $R^2$ of 0.9 (FIG. 8). The unexplained variance is partly due to the manual determination of the contact events using frame-by-frame analysis.

Validation of Long-Term Monitoring

To demonstrate that the software could continuously operate to gather data over prolonged periods we gathered the touchscreen events for a month long period (FIG. 9). The software stored the data locally and due to our compression techniques this occupied only a small fraction of the storage. For instance, for a user who generated 11,000 touchscreen events per day it we estimate an occupation of less than 150 MB local storage space to be used per year.

Examples of Analysis

To further demonstrate how the touchscreen events may be used in diverse forms of analysis, we estimated the median gaps in usage at night (FIG. 10). In another set of analysis, we estimated the time taken to transition between a social App (such as Twitter, Facebook, Gmail) to a non-social App (such as AccuWeather, CNN, or Google Search, FIG. 11).

CONCLUSION

Our software provided a high-resolution behavioral overview with a millisecond range temporal resolution. This could be used to derive and study a range of behavioral parameters, from the maximum speed of motor performance on the screen to the overall circadian patterns.

| List of reference signs | |
|---|---|
| 1 | Monitoring application |
| 2 | Foreground application |
| 3 | Touchscreen event |
| 4 | Event data |
| 41 | Time stamp |
| 42 | Identification |
| 5 | Cache memory |
| 6 | Handheld device |
| 61 | Display screen |
| 62 | Home button |
| 63 | On-off switch |
| 64 | Invisible window |
| A | Window area |

The invention claimed is:

1. A method for monitoring touchscreen events (3) of a handheld device (6), wherein
a monitoring application (1) is provided,
at least one touchscreen event (3) on a display screen (61) of said handheld device (6) is detected by means of said monitoring application (1), said monitoring application being a touch sensing unit, wherein said at least one touchscreen event (3) is directed to a foreground application (2),
event data (4) is generated for said at least one touchscreen event (3) by means of said monitoring application (1), wherein said event data (4) comprises a time stamp (41) of said at least one touchscreen event (3) and an identification (42) of said foreground application (2), wherein a select or relevant information of said at least one touchscreen event (3) is directed to a background application when a specific permission is granted to said background application, wherein said touch sensing unit obtains said specific permission at its launch to act as a background application,
said event data (4) is stored by means of said monitoring application (1), wherein the position of the monitoring application (1) in the architecture of hardware and software components of the handheld device (6) is in an application layer downstream of an operating system queue of the handheld device (6) and upstream of the foreground application (2) in the application layer in a serial arrangement of the operating system queue, the monitoring application and the foreground application, such that the touchscreen events are first intercepted by the monitoring application and then delivered from the monitoring application to the foreground application, thereby providing accurate and high-resolution time stamp (41) data.

2. The method according to claim 1, wherein said monitoring application (1) comprises an invisible window (64) comprising a window area (A) on said display screen (61) of said handheld device (6), wherein touchscreen events (3) within and outside said window area (A) are detected by means of said monitoring application (1).

3. The method according to claim 2, wherein said window area (A) has a size between 10×10 pixels and 20×20 pixels.

4. The method according to claim 3, wherein said window area (A) has a size of 100 pixels or less.

5. The method according to claim 1, wherein said time stamp (41) comprises a temporal resolution that is smaller than 15 ms.

6. The method according to claim 1, wherein said event data (4) further comprises spatial coordinates of said at least one touchscreen event (3) on said display screen (61) of said handheld device (6), a parameter indicating whether a pop-up keypad is displayed on said display screen (61) of said handheld device (6), and/or the number of pixels activated by means of said at least one touchscreen event (3).

7. The method according to claim 6, wherein said time stamp (41) comprises a temporal resolution that is smaller than 5 ms.

8. The method according to claim 7, wherein said slow activity occurs at a timescale of more than 1 h.

9. The method according to claim 1, wherein at least one button event is detected by means of said at least one monitoring application (1), and wherein event data (4) comprising a time stamp (41) of said at least one button event is generated and stored by means of said monitoring application (1).

10. The method according to claim 1, wherein said event data (4) is stored in a cache memory (5) of said handheld device (6).

11. The method according to claim 10, wherein a screen-off-event is detected by means of said monitoring application (1), and wherein said event data (4) in said cache memory (5) is stored in a permanent memory following detection of said screen-off-event.

12. The method according to claim 11, wherein said at least one button event is at least one home button event or at least one on-off switch event.

13. The method according to claim 1, wherein a reboot event of said handheld device (6) is detected, and wherein said monitoring application (1) is automatically started following said reboot event.

14. The method according to claim 1, wherein said method is used to collect data for analyzing a behavior of at least one subject.

15. The method according to claim 14, wherein said analyzed behavior comprises at least one fast activity, wherein said fast activity occurs at a timescale of less than 1 s.

16. The method according to claim 14, wherein said analyzed behavior comprises at least one slow activity, wherein said slow activity occurs at a timescale of more than 1 s.

17. The method according to claim 14, wherein said analyzed behavior comprises at least one fast activity and at least one slow activity, wherein said fast activity occurs at a timescale of less than 1 s, and wherein said slow activity occurs at a timescale of more than 1 s.

18. A computer program product for monitoring touchscreen events, the computer program product comprising a non-transitory computer-readable storage medium having program code embodied therewith, the program code executable by at least one hardware processor to execute the method according to claim 1, after the computer program is loaded and installed.

19. The method according to claim 18, wherein said fast activity occurs at a timescale of less than 100 ms.

* * * * *